United States Patent
Madsen et al.

(10) Patent No.: US 9,197,104 B2
(45) Date of Patent: Nov. 24, 2015

(54) VENTING DEVICE FOR ELECTRIC MACHINE

(75) Inventors: John Ernst Nielsen Madsen, Lemont, IL (US); Joseph Randall Bushen, Mokena, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 416 days.

(21) Appl. No.: 13/557,277

(22) Filed: Jul. 25, 2012

(65) Prior Publication Data

US 2014/0028123 A1  Jan. 30, 2014

(51) Int. Cl.
*H02K 9/22* (2006.01)
*H02K 1/20* (2006.01)

(52) U.S. Cl.
CPC ... *H02K 1/20* (2013.01); *H02K 9/22* (2013.01)

(58) Field of Classification Search
CPC .......................................................... H02K 1/20
USPC ................................. 310/59, 64, 65
IPC .......................................................... H02K 1/20
See application file for complete search history.

(56) References Cited

U.S. PATENT DOCUMENTS

| | | | |
|---|---|---|---|
| 595,364 A | 12/1897 | Batchelder | |
| 663,075 A | 12/1900 | Geisenhöner | |
| 890,577 A * | 6/1908 | Walter | 310/65 |
| 903,829 A * | 11/1908 | Behrend | 310/65 |
| 925,271 A | 6/1909 | Behrend | |
| 1,476,986 A | 12/1923 | Kusterman | |
| 1,793,434 A | 2/1931 | Blathy | |
| 3,171,996 A * | 3/1965 | Alger et al. | 310/51 |
| 4,182,966 A | 1/1980 | Mishra et al. | |
| 4,362,959 A | 12/1982 | Bartheld et al. | |
| 5,814,910 A | 9/1998 | Pelletier | |
| 6,777,836 B2 | 8/2004 | Tong et al. | |
| 2007/0085440 A1 | 4/2007 | Jeske | |
| 2011/0127862 A1 | 6/2011 | Eichinger et al. | |
| 2011/0140552 A1 | 6/2011 | Lokhandwalla et al. | |
| 2012/0169159 A1* | 7/2012 | DiLorenzo | 310/59 |

FOREIGN PATENT DOCUMENTS

EP  0893871  1/1999
JP  11252830 A  *  9/1999

OTHER PUBLICATIONS

Machine Translation, Masunaga et al., JP 11252830 A, Sep. 17, 1999.*

* cited by examiner

*Primary Examiner* — Thomas Truong
(74) *Attorney, Agent, or Firm* — Miller, Matthias & Hull LLP

(57) ABSTRACT

A venting device to define a venting pathway between adjacent stacked laminations of a stator assembly of an electric machine is provided. The venting device comprises a first mesh plate and a second mesh plate. The first mesh plate includes a set of angled first slats and a set of first interconnecting members connecting adjacent first slats. The second mesh plate includes a set of angled second slats and a set of second interconnecting members. The set of angled second slats are disposed above the set of first slats. The set of second interconnecting members connect adjacent second slats and are positioned offset from the set of first interconnecting members.

20 Claims, 5 Drawing Sheets

VENTING DEVICE FOR ELECTRIC MACHINE

TECHNICAL FIELD

The present disclosure relates to a venting device, and more particularly to a venting device to define a venting pathway between adjacent stacked laminations of a stator assembly of an electric machine.

BACKGROUND

Spacer blocks are generally used to ventilate an electric machine such as a motor, or a generator. During installation, a spacer block is usually interspersed between laminated stacks and welded to the adjacent laminated stacks. Typically, conventional spacer blocks are made up of several components welded together. The number of welds required while forming the spacer block from several constituent components may be large and hence the spacer block may be failure prone. Furthermore, the several welds involved during the welding process may be tedious and time consuming. Hence, all of the above stated factors may make the manufacture of the spacer blocks uneconomical and expensive.

U.S. Published Application No. 2011/0140552 ('552 application) relates to a stator assembly including a segmented stator having stator portions. Each stator portion includes stator laminations having stator windings, spacer plates having a portion embedded within the stator laminations, and structural plates having a portion embedded within the stator laminations. The portion of each of the spacer plates and each of the structural plates has openings to allow a cooling medium to flow between the stator laminations.

SUMMARY OF THE DISCLOSURE

In one aspect, the present disclosure provides a venting device to define a venting pathway between adjacent stacked laminations of a stator assembly of an electric machine. The venting device includes a first mesh plate and a second mesh plate. The first mesh plate includes a set of angled first slats and a set of first interconnecting members connecting adjacent first slats. The second mesh plate includes a set of angled second slats and a set of second interconnecting members. The set of angled second slats are disposed above the set of first slats. The set of second interconnecting members connect adjacent second slats and are positioned offset from the set of first interconnecting members.

In another aspect, the present disclosure discloses the stator assembly of the electric machine. The stator assembly includes multiple stacked laminations and multiple venting devices to define the venting pathway between adjacent stacked laminations of the electric machine. The venting device includes the first mesh plate and the second mesh plate. The first mesh plate includes the set of angled first slats and the set of first interconnecting members connecting adjacent first slats. The second mesh plate includes the set of angled second slats and the set of second interconnecting members. The set of angled second slats are disposed above the set of first slats. The set of second interconnecting members connect adjacent second slats and are positioned offset from the set of first interconnecting members.

In another aspect, the present disclosure discloses the electric machine including a rotor assembly and the stator assembly. The stator assembly is disposed around the rotor assembly. The stator assembly includes multiple stacked laminations, and multiple venting devices to define the venting pathway between adjacent stacked laminations of the electric machine. The venting device includes the first mesh plate and the second mesh plate. The first mesh plate includes the set of angled first slats and the set of first interconnecting members connecting adjacent first slats. The second mesh plate includes the set of angled second slats and the set of second interconnecting members. The set of angled second slats are disposed above the set of first slats. The set of second interconnecting members connect adjacent second slats and are positioned offset from the set of first interconnecting members.

Other features and aspects of this disclosure will be apparent from the following description and the accompanying drawings.

DETAILED DESCRIPTION

Figure 1:
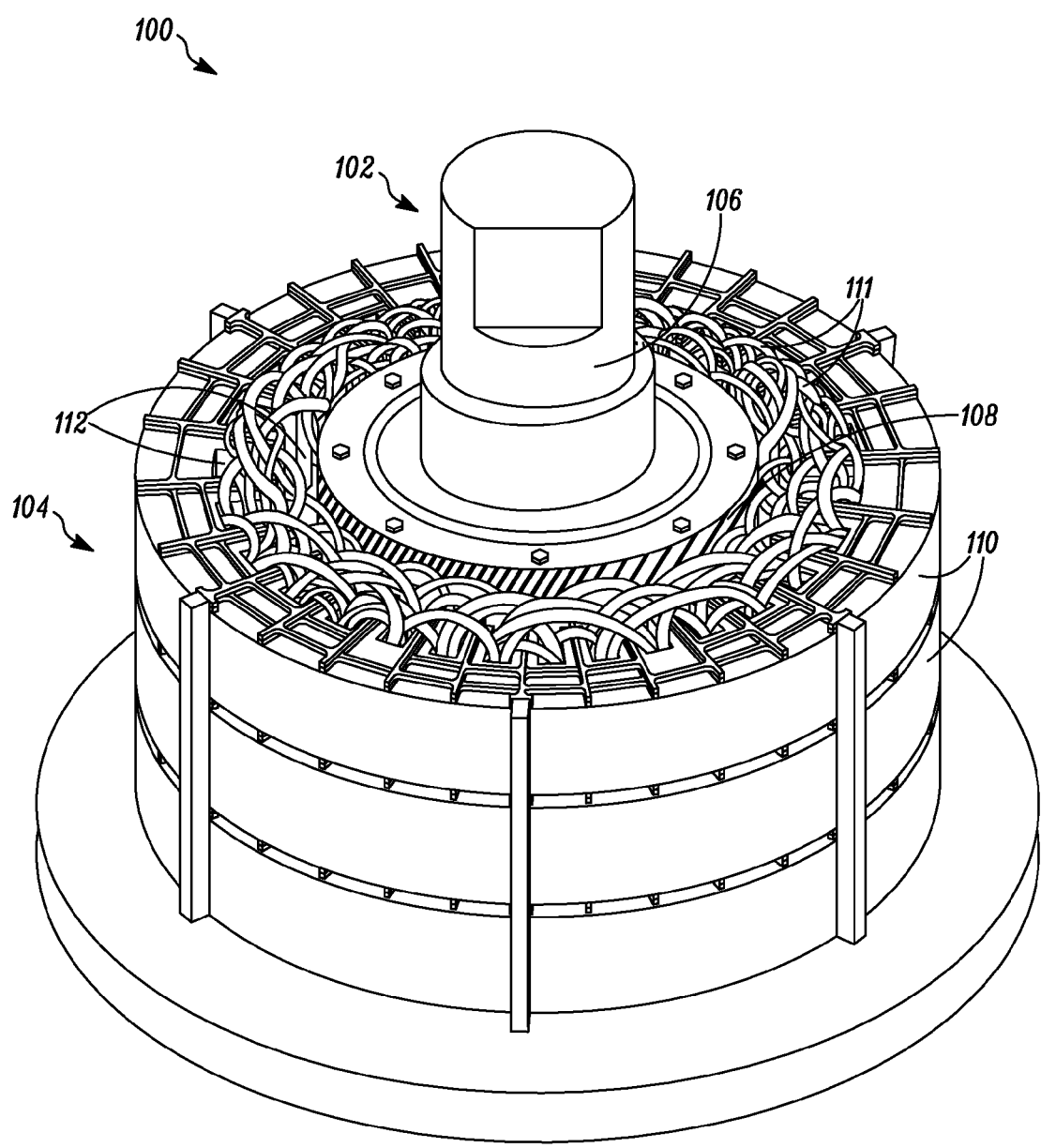
FIG. 1 is a perspective view of an exemplary electric machine.

The present disclosure relates to a venting device to define a venting pathway between adjacent stacked laminations of a stator assembly of an electric machine. FIG. 1 shows a perspective view of an exemplary electric machine 100. The electric machine 100 may be, for example, an alternator, a motor, a generator, and the like. In an embodiment, as shown in FIG. 1, the electric machine 100 may embody an alternator which may be used for producing alternating current. The alternator may be one that is used in heavy locomotives such as trains, trams, and the like, wherein the alternating current may be used to power primary or auxiliary motors in locomotives.

The electric machine 100 includes a rotor assembly 102, and a stator assembly 104. The rotor assembly 102 may include a shaft 106 drivably coupled to a prime mover such as an engine. The rotor assembly 102 may further include multiple electro-magnets 108 disposed on the shaft 106. When the prime mover rotates the shaft 106 the electro-magnets 108 disposed on the shaft 106 also rotate. The stator assembly 104 is disposed around the rotor assembly 102. The stator assembly 104 may include multiple sets of stacked laminations 110 and windings 111 wound on the stacked laminations 110. The stacked laminations 110 of the stator assembly 104 are placed in close tolerance with the rotor assembly 102. In an embodiment as shown, the stacked laminations 110 may include multiple inwardly extending teeth 112 to allow the windings 111 to be wound on the teeth 112.

During operation of the electric machine 100, the electro-magnets 108 of the rotor assembly 102 are rotated to produce a rotating magnetic field. This rotating magnetic field may cut across the stationary set of conductors and produce an electromotive force (EMF) in the windings 111. This electromotive force may manifest itself as alternating current in the windings 111 of the stator assembly 104.

As known to a person having ordinary skill in the art, during production of EMF in the stationary set of conductors, the stationary set of conductors offers electrical resistance.

This electrical resistance offered is based on the materials constituting the stationary set of conductors by virtue of its inherent electrical resistance property. This electrical resistance manifests itself as heat in the electric machine 100. Hence, constant production of EMF or alternating current in the stator assembly 104 causes heat to be produced as a byproduct. This production of heat is more pronounced in the case of large electric machines 100.

Figure 2:
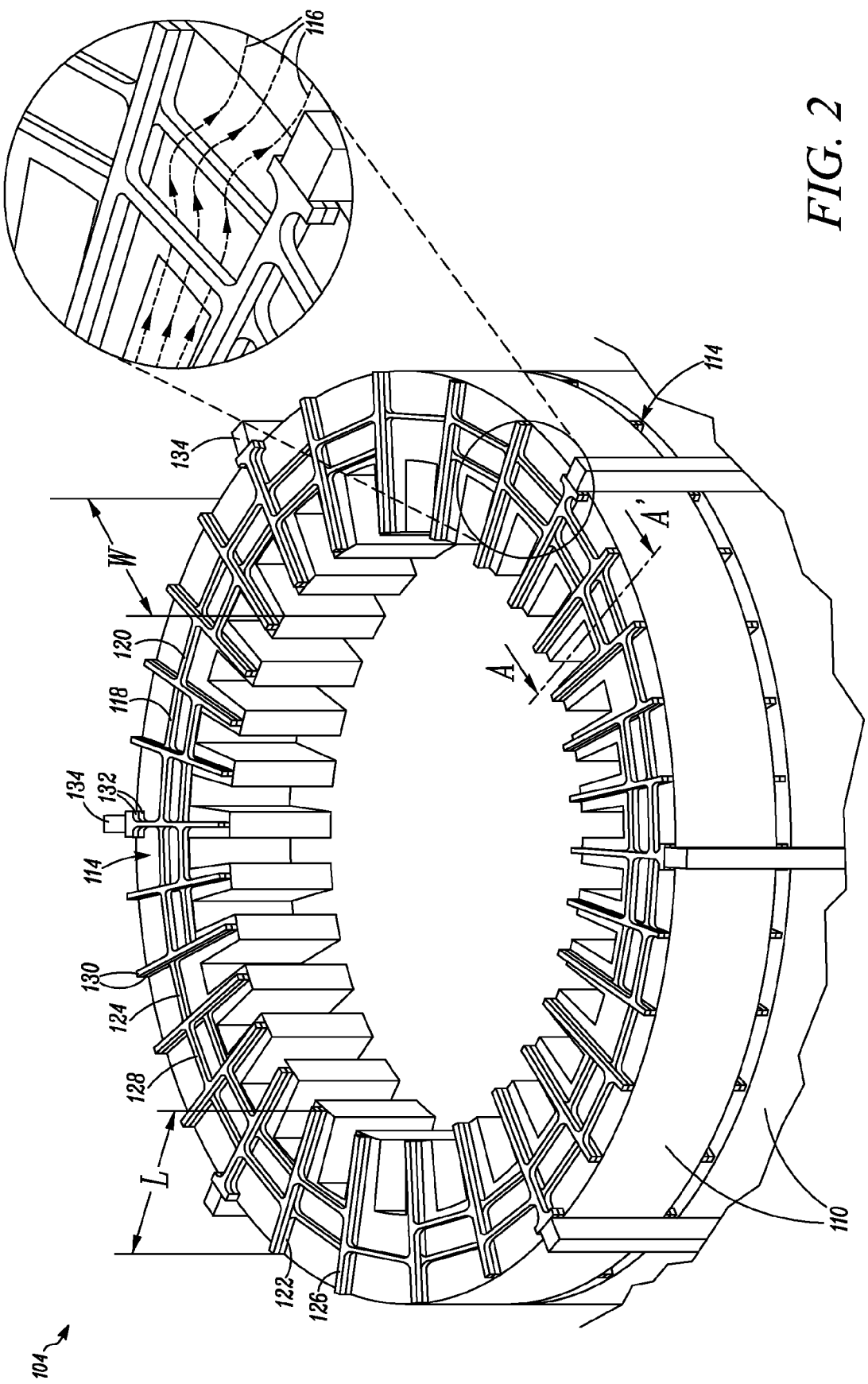
FIG. 2 is a perspective view of the electric machine in an unassembled state.

FIG. 2 is a perspective view of the electric machine 100 in an unassembled state. For the purposes of clearer illustration and better understanding of this disclosure, two stacked laminations 110 without windings 111 have been shown in FIG. 2. An electric machine 100 may include any number of stacked laminations 110 with windings 111, disposed above and below the stacked laminations 110 of FIG. 2. Therefore, it is to be understood that a portion of the stator assembly 104 including the stacked laminations 110 with windings 111 has been eliminated from FIG. 2.

As shown in FIG. 2, the stator assembly 104 further includes multiple venting devices 114. The venting devices 114 define venting pathways 116 between adjacent stacked laminations 110 of the stator assembly 104 and provide cooling by dissipation of heat from the rotor assembly 102 and the stator assembly 104 via the venting pathway 116. The venting device 114 includes a first mesh plate 118 and a second mesh plate 120. The first mesh plate 118 includes a set of angled first slats 122 and a set of first interconnecting members 124 connecting adjacent first slats 122. The second mesh plate 120 includes a set of angled second slats 126 and a set of second interconnecting members 128.

In an embodiment, the first mesh plate 118 and the second mesh plate 120 are manufactured by performing stamping or punching operation on sheet metal blanks. In another embodiment, the first mesh plate 118 and the second mesh plate 120 are manufactured by performing a laser cutting operation on sheet metal blanks. In another embodiment, the first mesh plate 118 and the second mesh plate 120 are manufactured by performing cast extrusion on sheet metal blanks. Although, it is disclosed in preceding embodiments that the first mesh plate 118 and the second mesh plate 120 are manufactured by performing stamping or punching operation, laser cutting operation, or cast extrusion process on sheet metal blanks, a person having ordinary skill in the art may acknowledge that the processes of manufacture disclosed herein are only exemplary in nature and that the first mesh plate 118 and the second mesh plate 120 may be manufactured by other methods and processes commonly known in the art.

As illustrated in FIG. 2, the set of angled second slats 126 are disposed above the set of first slats 122. The set of second interconnecting members 128 connect adjacent second slats 126. The set of second interconnecting members 128 are positioned offset from the set of first interconnecting members 124. In an embodiment, multiple venting devices 114 are configured to be disposed in an annular configuration between the adjacent stacked laminations 110 of the stator assembly 104. In another embodiment, one or both of the mesh plates 118, 120 may be annularly shaped. Therefore, in this embodiment, a unitary venting device 114 may be formed by the mesh plates 118, 120, and placed between a pair of adjacent stacked laminations 110.

As disclosed earlier, the stacked laminations 110 of the stator assembly 104 are placed in close tolerance with the rotor assembly 102. During operation of the electric machine 100, the rotor assembly 102 may rotate at high speeds. Therefore, the rotor assembly 102 may need to be protected from any consequential damage arising out of an intrusion of any object into the rotor assembly 102. Hence, in this embodiment, a length L of each of the first slats 122 and the second slats 126 are equal to or less than a width W of the stacked laminations 110 of the stator assembly 104. In an embodiment, each of the first and the second slats 122, 126 are of a substantially square cross section to facilitate disposal of the second slats 126 above the first slats 122 and avoid relative slip of the second slat with respect to the first slat.

In an embodiment as shown in FIG. 2, an outer end 130 of the first and the second slats 122, 126 may include a pad 132 that is configured to rigidly attach to a tie rod 134. Further, the pad 132 at the outer end 130 of the first and the second slats 122, 126 may be rigidly attached to a respective abutting stacked lamination 110. In an embodiment, the pad 132 may be rigidly attached to the tie rod 134 and the stacked lamination 110 by welding. A person of ordinary skill in the art will acknowledge that the method of rigidly attaching the pad 132 to the tie rod 134 and the stacked lamination 110 described above is exemplary in nature and does not limit the scope of this disclosure. Any known method such as brazing, soldering, bolting, clamping and the like may be used to accomplish the rigid attachment of the pad 132 to the tie rod 134 and the stacked lamination 110.

Figure 3:
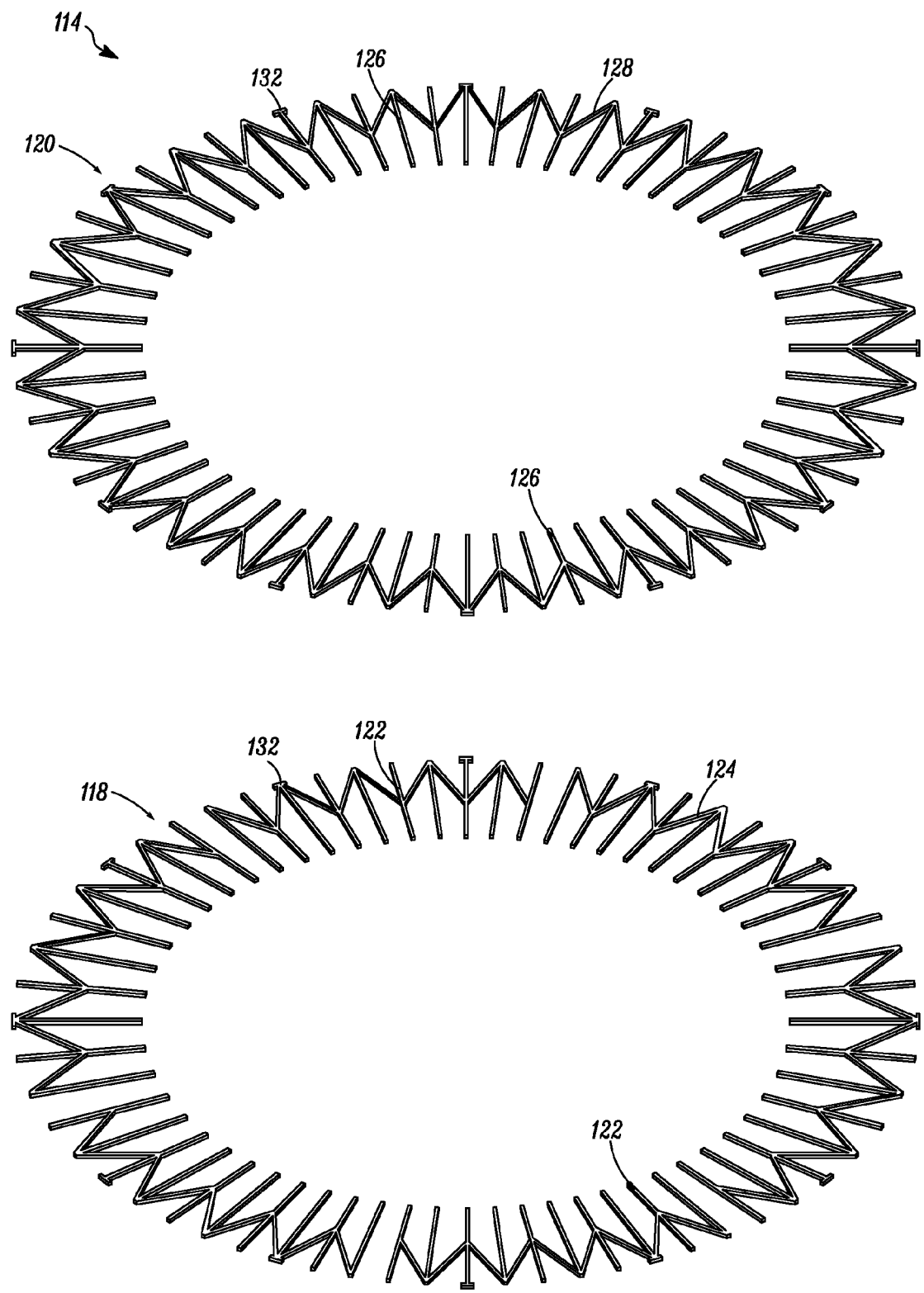
FIG. 3 is an exploded view of a venting device in accordance with an embodiment of the present disclosure.

FIG. 3 is an exploded view of the venting device 114 in accordance with an embodiment of the present disclosure. As illustrated, the first interconnecting members 124 connecting adjacent first slats 122 and the second interconnecting members 128 connecting adjacent second slats 126 are positioned offset with each other. However, in this embodiment, the first interconnecting members 124 and the second interconnecting members 128 are disposed in a convergent opposing fashion to reduce resistance to the flow of hot air while heat is being dissipated from the rotor assembly 102 and the stator assembly 104 of the electric machine 100. Further, the first interconnecting members 124 and the second interconnecting members 128 of this embodiment may reduce flow resistance to any cool air that may enter the electric machine 100.

Figure 4:
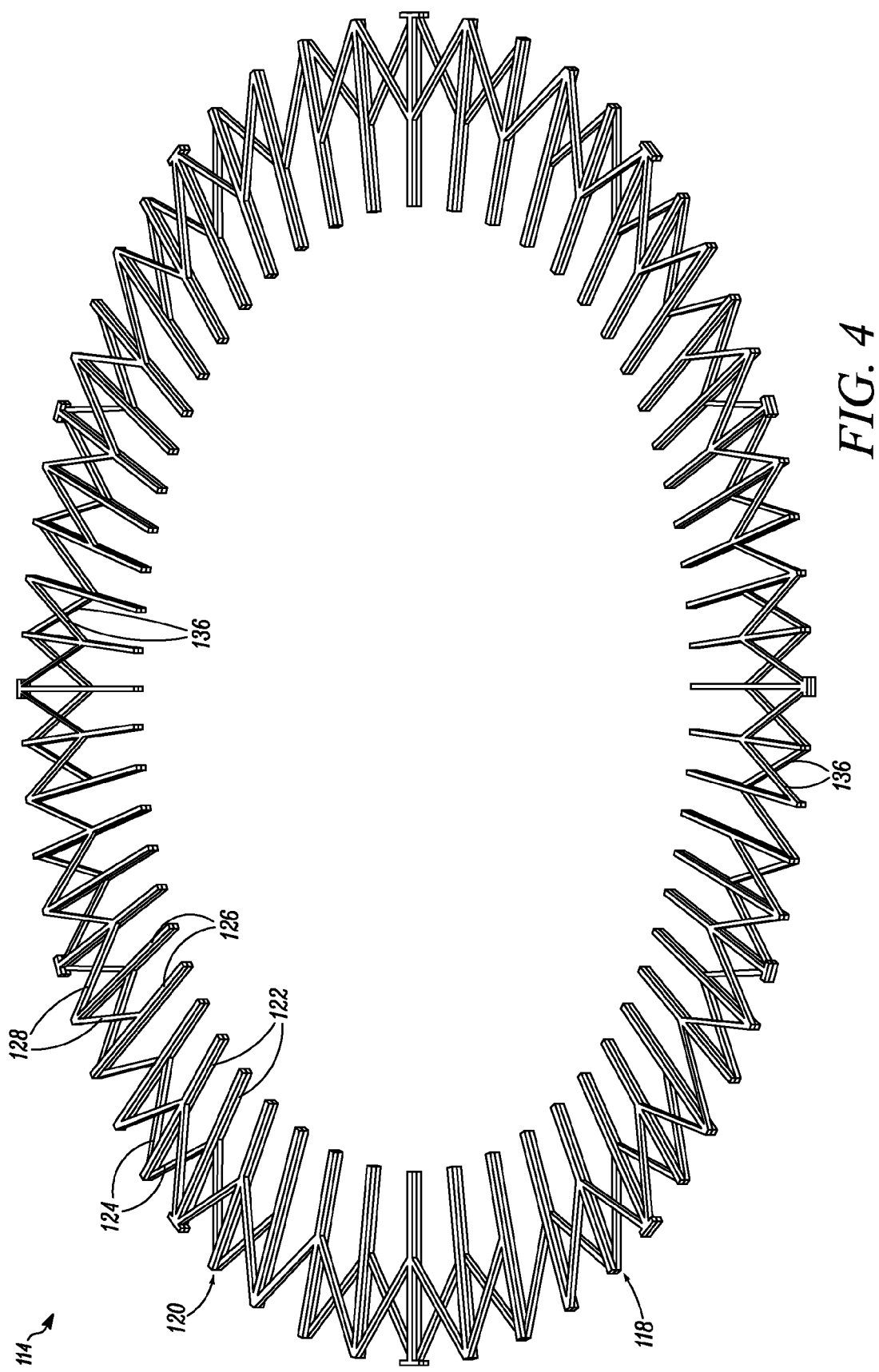
FIG. 4 shows an assembled view of the venting device of FIG. 3.

FIG. 4 shows an assembled view of the venting device 114 of FIG. 3. As can be seen from FIG. 4 and understood by a person having ordinary skill in the art, the convergent opposing fashion of the first and the second interconnecting members 124, 128 exposes slanted surface areas 136 to contact the hot air blown out from within the electric machine 100 via the venting pathways 116. The slanted surface areas 136 provided by the first and the second interconnecting members 124, 128 of this embodiment allows the hot air to encounter less drag resistance from the first and the second interconnecting members 124, 128. Hence, the hot air may easily flow out of the electric machine 100 and the amount of heat dissipation per unit time may be increased.

In the embodiments disclosed in FIGS. 2-4, it can be seen that the first mesh plate 118 and the second mesh plate 120 are substantially identical to each other. Hence, the venting device 114 may be assembled by using a pair of mesh plates 118, 120 that are of the same kind, for example, a pair of first mesh plates 118 or a pair of second mesh plates 120. Consequently, the respective interconnecting members 124, 128 of the similar mesh plates 118, 120 may also be similar in position and configuration. Therefore, during assembly, one of the mesh plates 120 may be turned upside down and placed over the other mesh plate 118 such that the interconnecting members 124, 128 of the respective mesh plates 118, 120 are in a convergent opposing fashion. A person having ordinary skill in the art may acknowledge that it is possible to have the first and second mesh plates 118, 120 distinct from each other, whereby the mesh plates 118, 120 may be assembled in the aforesaid manner to form the venting device 114. Hence, it is to be understood that, although the above disclosure discloses the venting device 114 as including the first mesh plate 118 and the second mesh plate 120; the scope of the mesh plates 118, 120 disclosed herein is not limited to the first mesh plate 118 and second mesh plate 120 but may extend to include mesh plates 118, 120 of similar or dissimilar configurations thereby allowing use of the similar or dissimilar mesh plates 118, 120 to form the venting device 114.

Figure 5:
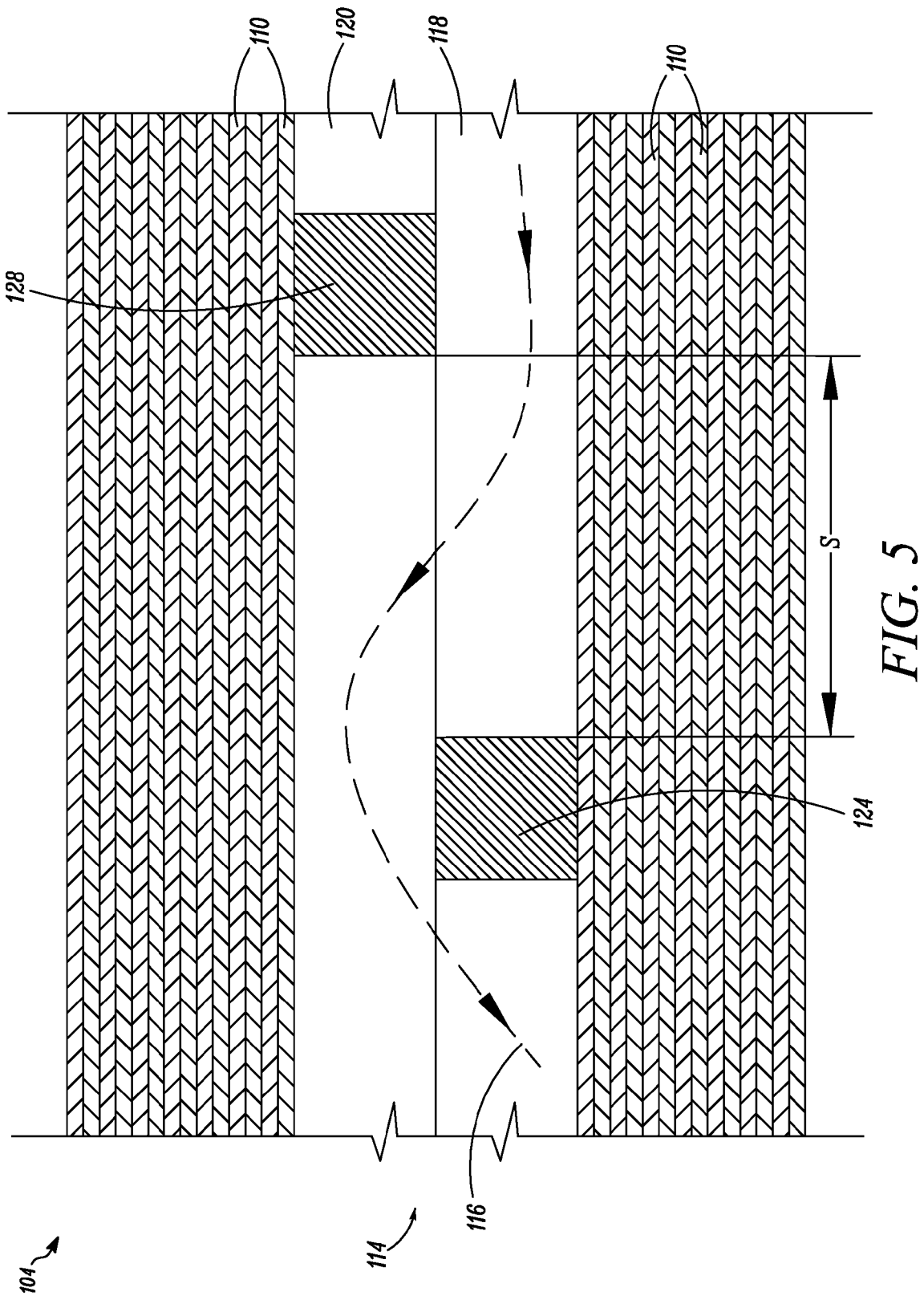
FIG. 5 is a sectional view of a stator assembly along section A-A' of FIG. 2.

FIG. 5 is a sectional view of the stator assembly 104 along section A-A' of FIG. 2. As shown in FIG. 5, the venting device 114 defines a venting pathway 116 between the adjacent stacked laminations 110. The extent of offset S as seen between the interconnecting members 124, 128, in FIG. 5, may be selected such that a flow of air is allowed into and out of the electric machine 100 via the venting pathway 116 defined between adjacent stacked laminations 110. Thus, the venting pathway 116 allows heat and air exchange to take place between the atmosphere and the electric machine 100. A person having ordinary skill in the art will acknowledge that the extent of offset S between the second interconnecting members 128 and the first interconnecting members 124 may be selected based on a size of the venting pathway 116 and hence an amount of air flow required into and out of the electric machine 100 via the venting pathway 116.

INDUSTRIAL APPLICABILITY

Typically, the windings 111 of the stator assembly 104 may be of a metallic nature, for example, copper. As disclosed earlier, during operation of the electric machine 100, current is produced in the windings 111 of the stator assembly 104. Hence, the windings 111 of the stator assembly 104 present an inherent electrical resistance property to the flowing current. This electrical resistance manifests itself as heat and the heat may be detrimental to the service life of many components such as bearings and insulating claddings within the electric machine 100. In extreme cases, this heat may result in melting of insulation claddings of wires or cause a fire within the electric machine 100. Hence, heat generated within the electric machine may need dissipation to avoid failure of any component within the electric machine 100.

Further, as known to a person having ordinary skill in the art, air exists in spaces within the electric machine 100. For the purposes of understanding, the spaces disclosed herein may refer to the space between the rotor assembly 102 and the stator assembly 104. The air present in this space may be forced out centrifugally due to momentum transfer by the high speed rotation of the rotor assembly 102. This air may be used as a medium to carry heat from the abutting rotor assembly 102 and stator assembly 104. The venting device 114 thus provides the venting pathway 116 through which the air carrying the heat may be exhausted into the atmosphere. In some cases, large electric machines 100 are generally force ventilated where atmospheric air is forced by a fan or other auxiliary device into the electrical machine 100 via the venting pathway 116. Hence, the venting device 114 defining the venting pathway 116 may be used to uniformly cool down the electric machine 100. Therefore, use of the venting device 114 in the electric machine 100 may allow cool down the electric machine during operation since a temperature within the electric machine 100 is maintained below safe and acceptable limits.

Furthermore, prolonged use of the venting device 114 in the electric machine 100 may result in lower maintenance costs by avoiding frequent repairs and replacement of components within the electric machine 100 otherwise negatively impacted by high temperatures. Furthermore, down times associated with the repairs and replacement of components within the electric machine 100 may be reduced. Hence, the venting device 114 may increase overall productivity and profitability associated with operation of the electric machine 100.

Conventional spacer blocks may be manufactured by using solid metal sheets and welding I-section members on a side of the metal sheets. The spacer blocks may be placed between adjacent stacked laminations 110 and welded to the adjacent stacked laminations 110 of the stator assembly 104. These spacer blocks are tedious to manufacture and assemble onto the electric machine 100 due to the numerous welds involved in manufacturing and assembly. Further, during operation, the welds may fail under the influence of stresses and may cause the spacer blocks to spin centrifugally, thus damaging the rotor assembly 102.

The venting device 114 disclosed herein may be obtained by merely placing the first and the second mesh plate 118, 120 together between the adjacent stacked laminations 110. Further, the first mesh plate 118 and the second mesh plate 120 may be monolithic structures manufactured by performing stamping or punching process, laser cutting process, or cast extrusion process on sheet metal blanks. These manufacturing processes may be economical and reduce costs in assembly of the venting device 114 to the electric machine 100. Furthermore, the electric machine 100 may be quickly set up with minimal effort while also saving time.

A person having ordinary skill in the art may acknowledge that although welds may be required to attach the venting device 114 to the stator assembly 104, the number of welds involved may be less compared to the number of welds used to make and assemble a spacer block having a similar specification or configuration. Hence, the costs incurred in manufacture of the venting device 114 may be substantially less when compared to a cost of manufacture of a spacer block.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

We claim:

1. A venting device to define a venting pathway between adjacent stacked laminations of a stator assembly of an electric machine, the venting device comprising:
    a first mesh plate including:
        a set of angled first slats; and
        a set of first interconnecting members connecting adjacent first slats, consecutive first interconnecting members being disposed in non-identical positions between first slats; and
    a second mesh plate including:
        a set of angled second slats disposed above the set of first slats; and
        a set of second interconnecting members connecting adjacent second slats, consecutive second interconnecting members being disposed in non-identical positions between second slats, wherein the set of second interconnecting members is radially offset from the set of first interconnecting members.

2. The venting device of claim 1, wherein a plurality of venting devices is configured to be disposed in an annular configuration between the adjacent stacked laminations of the stator assembly.

3. The venting device of claim 1, wherein a length of each of the first slats and the second slats is one of equal to and less than a width of the stacked laminations of the stator assembly.

4. The venting device of claim 1, wherein the set of first interconnecting members and the set of second interconnecting members are disposed in a convergent opposing fashion.

5. The venting device of claim 1, wherein an outer end of the first and the second slats includes a pad that is configured to rigidly attach to a tie rod.

6. The venting device of claim 5, wherein the pad at the outer end of the first and the second slats is configured to rigidly attach to an abutting stacked lamination.

7. A stator assembly of an electric machine, the stator assembly comprising:
a plurality of stacked laminations; and
a plurality of venting devices to define a venting pathway between adjacent stacked laminations of the electric machine, the venting device including:
a first mesh plate including:
a set of angled first slats; and
a set of first interconnecting members connecting adjacent first slats, consecutive first interconnecting members being radially offset;
a second mesh plate including:
a set of angled second slats disposed above the set of first slats; and
a set of second interconnecting members connecting adjacent second slats, consecutive second interconnecting members being radially offset, wherein the set of second interconnecting members is radially offset from the set of first interconnecting members.

8. The stator assembly of claim 7, wherein a plurality of venting devices is configured to be disposed in an annular configuration between the adjacent stacked laminations.

9. The stator assembly of claim 7, wherein a length of each of the first slats and the second slats is one of equal to and less than a width of the stacked laminations.

10. The stator assembly of claim 7, wherein the set of first interconnecting members and the set of second interconnecting members are disposed in a convergent opposing fashion.

11. The stator assembly of claim 7, wherein an outer end of the first and the second slats includes a pad that is configured to rigidly attach to a tie rod.

12. The stator assembly of claim 11, wherein the pad at the outer end of the first and the second slats is configured to rigidly attach to an abutting stacked lamination.

13. An electric machine comprising:
a rotor assembly; and
a stator assembly disposed around the rotor assembly, the stator assembly including:
a plurality of stacked laminations; and
a plurality of venting devices to define a venting pathway between adjacent stacked laminations of the stator assembly, the venting device including:
a first mesh plate including:
a set of first angled slats; and
a set of first interconnecting members connecting adjacent first angled slats, consecutive first interconnecting members being disposed in non-identical positions between first slats;
a second mesh plate including:
a set of second angled slats disposed above the set of first angled slats; and
a set of second interconnecting members connecting adjacent second angled slats, consecutive second interconnecting members being disposed in non-identical positions between second slats, wherein the set of second interconnecting members is radially offset from the set of first interconnecting members.

14. The electric machine of claim 13, wherein the electric machine is one of an alternator, a generator, and a motor.

15. The electric machine of claim 13, wherein a plurality of venting devices is configured to be disposed in an annular configuration between the adjacent stacked laminations of the stator assembly.

16. The electric machine of claim 13, wherein a length of each of the first slats and the second slats is one of equal to and less than a width of the stacked laminations of the stator assembly.

17. The electric machine of claim 13, wherein the set of first interconnecting members and the set of second interconnecting members are disposed in a convergent opposing fashion.

18. The electric machine of claim 13, wherein an outer end of the first and the second slats includes a pad that is configured to rigidly attach to a tie rod.

19. The electric machine of claim 18, wherein the pad at the outer end of the first and the second slats is configured to rigidly attach to an abutting stacked lamination.

20. The electric machine of claim 13, wherein the each of the first and second slats are of a substantially square cross section.

* * * * *